(12) United States Patent
Katakura

(10) Patent No.: US 8,737,860 B2
(45) Date of Patent: May 27, 2014

(54) IMAGE FORMING APPARATUS AND IMAGE FORMING METHOD

(75) Inventor: Hiroshi Katakura, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 273 days.

(21) Appl. No.: 13/159,630

(22) Filed: Jun. 14, 2011

(65) Prior Publication Data
US 2011/0311255 A1  Dec. 22, 2011

Related U.S. Application Data

(60) Provisional application No. 61/355,795, filed on Jun. 17, 2010.

(51) Int. Cl.
*G03G 15/20* (2006.01)
(52) U.S. Cl.
USPC .................... 399/69; 399/70; 399/324
(58) Field of Classification Search
USPC ......................... 399/67, 69, 70, 324
See application file for complete search history.

(56) References Cited

U.S. PATENT DOCUMENTS 6,240,264 B1 * 5/2001 Yajima et al. .................... 399/82
6,751,425 B2 * 6/2004 Fujimori et al. ................. 399/69
7,110,691 B2 * 9/2006 Saida ............................... 399/69
2005/0135827 A1 * 6/2005 Akita et al. ..................... 399/69
2009/0103148 A1 4/2009 Murakami
2009/0103934 A1 4/2009 Murakami
2011/0217063 A1 9/2011 Noguchi

FOREIGN PATENT DOCUMENTS

CN           1786838        6/2006

OTHER PUBLICATIONS

Chinese Office Action for Chinese Application No. 201110161124.4 mailed on Aug. 26, 2013.

* cited by examiner

*Primary Examiner* — David Gray
*Assistant Examiner* — Carla Therrien
(74) *Attorney, Agent, or Firm* — Amin, Turocy & Watson, LLP

(57) ABSTRACT

According to one embodiment, an image forming apparatus includes an image forming portion, a fixer, a control operation selection portion which selects any one of a monochrome control operation of keeping the fixing temperature at a first temperature at which a monochrome image can be fixed, and a color control operation of keeping the fixing temperature at a second temperature higher than the first temperature, and a controller. In the state in which the monochrome control operation is selected, when the fixing temperature reaches the first temperature during rise, the controller executes a monochrome ready display and the monochrome control operation, the controller raises the fixing temperature up to the second temperature to print the color image when printing of a color image is instructed while the monochrome control operation is executed, and the controller executes the monochrome control operation after printing the color image.

18 Claims, 10 Drawing Sheets

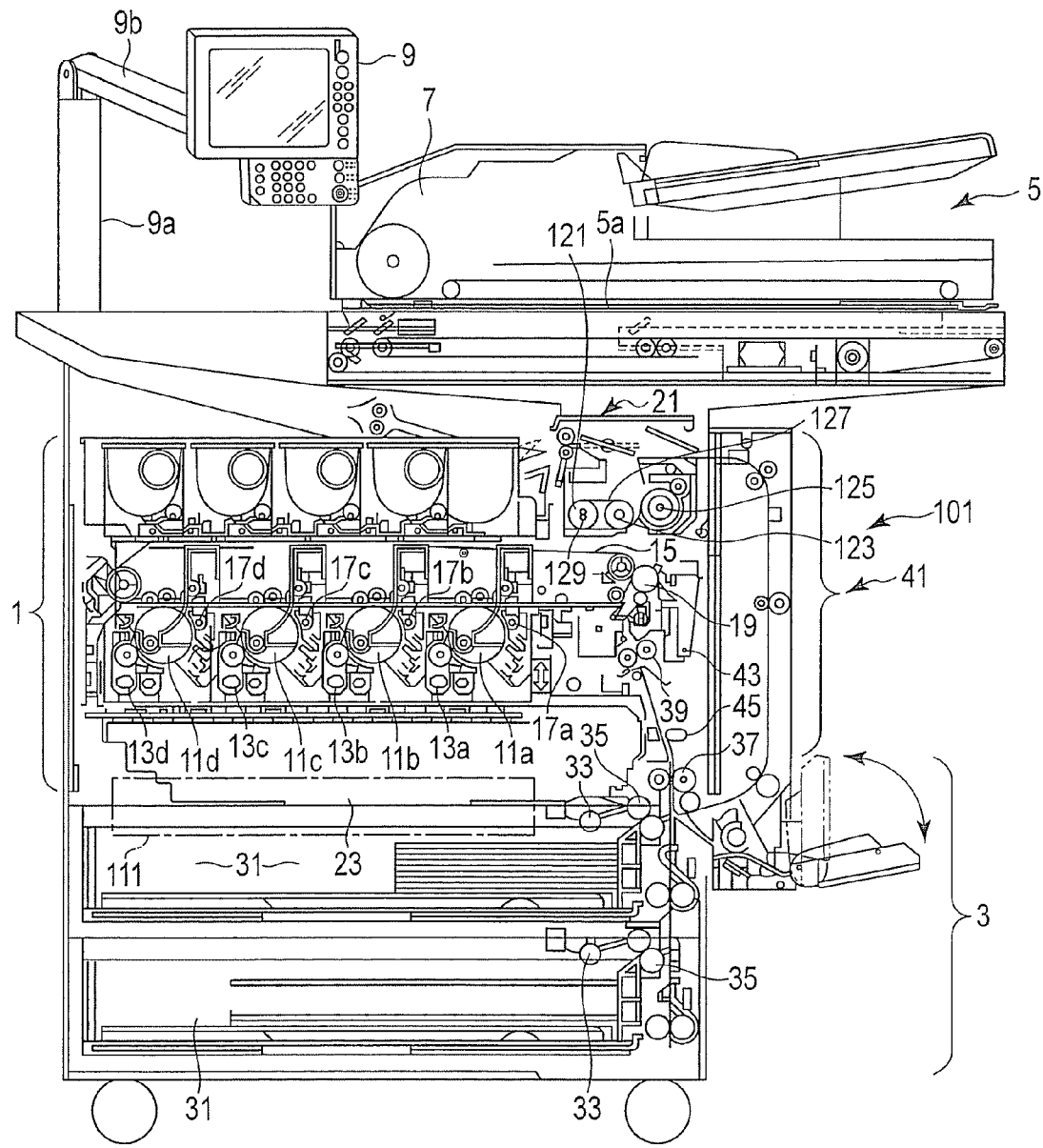
F I G. 1

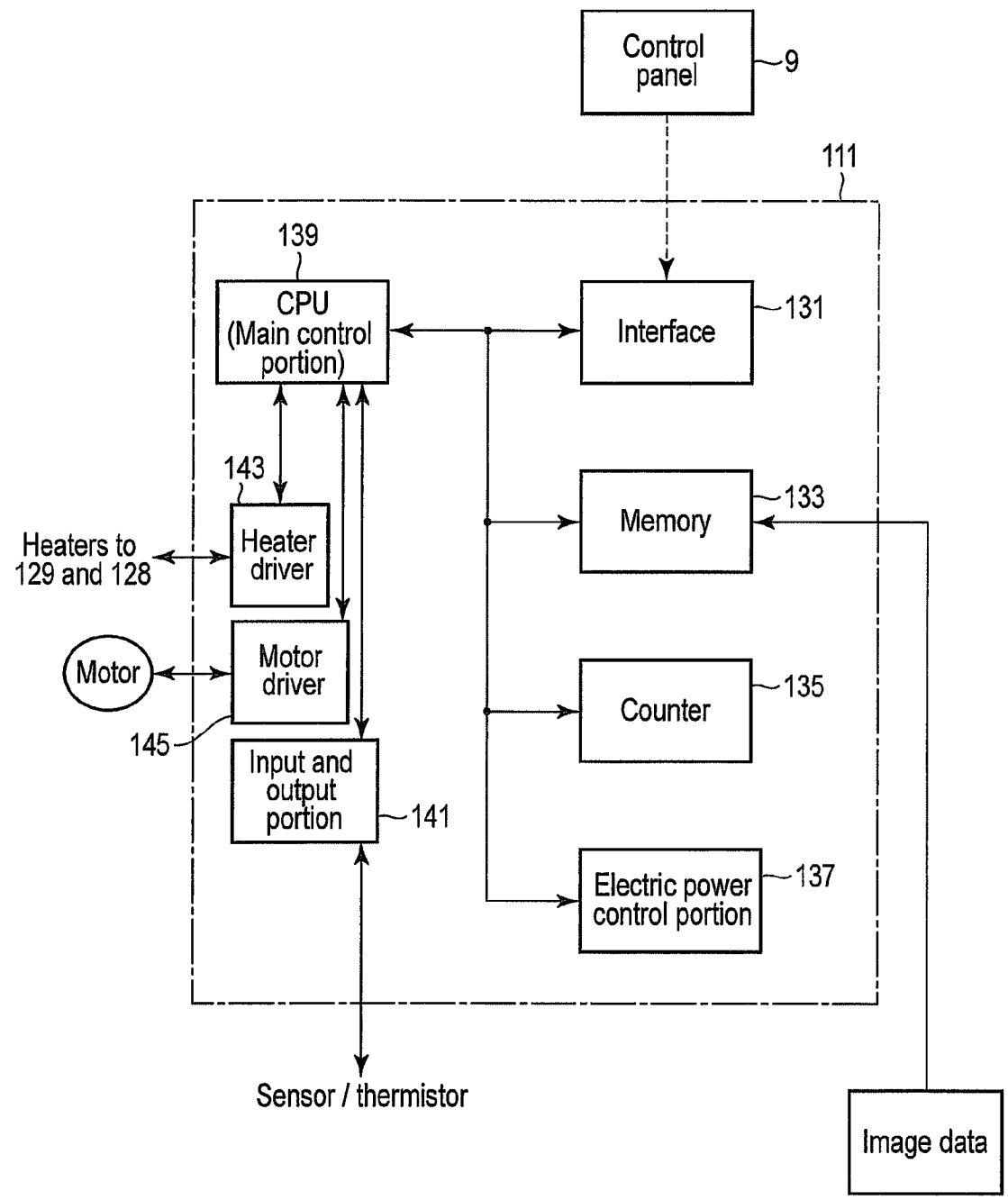
F I G. 2

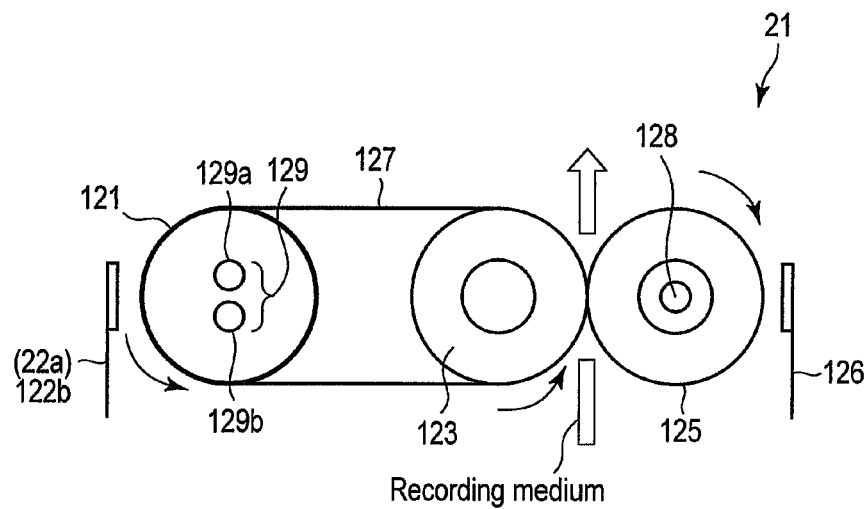
F I G. 3
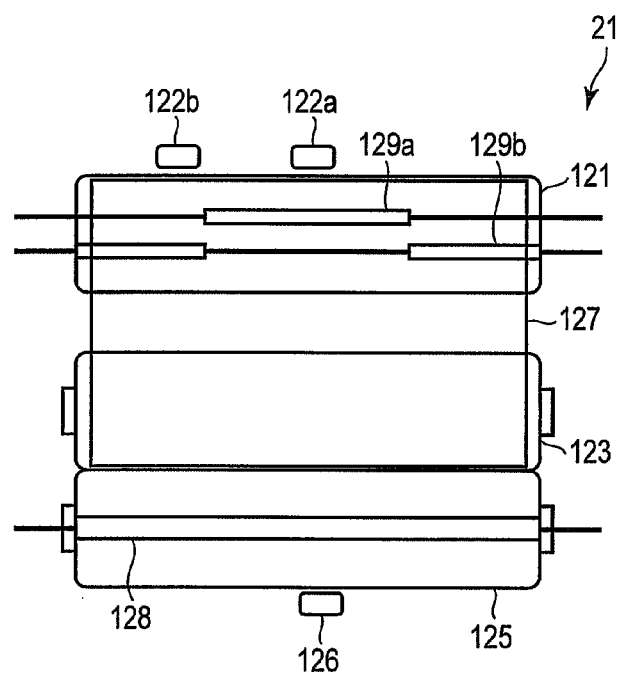
F I G. 4

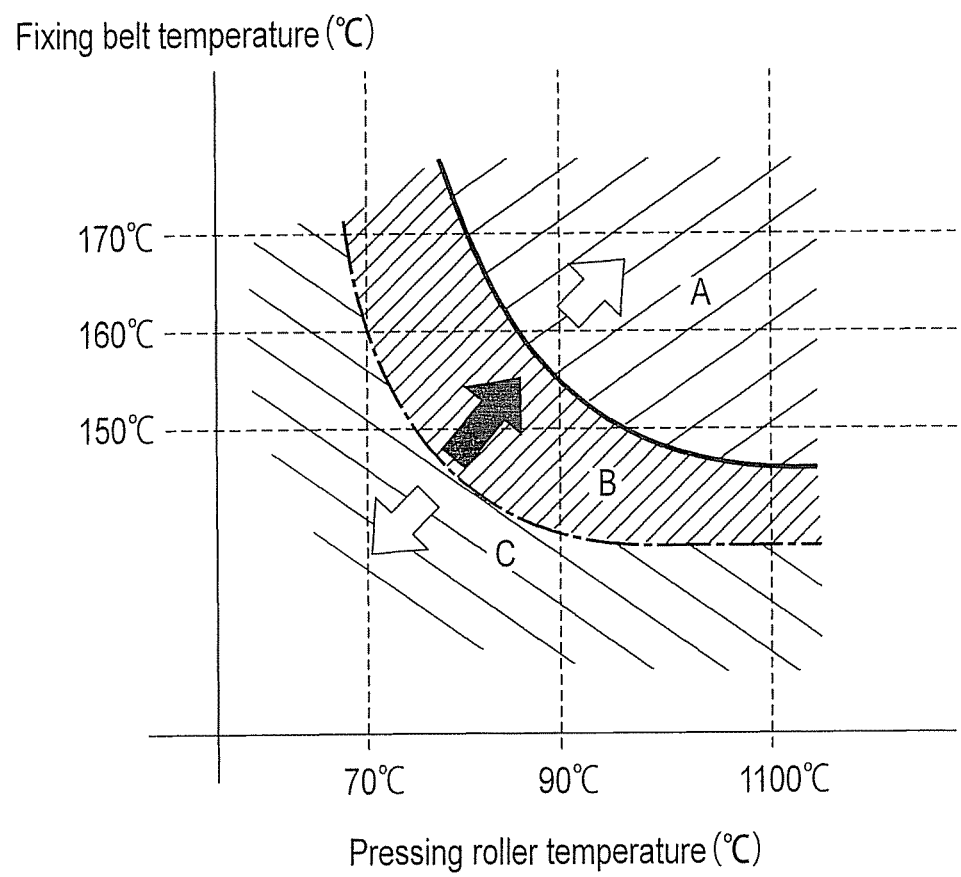
F I G. 5

IMAGE FORMING APPARATUS AND IMAGE FORMING METHOD

CROSS-REFERENCE TO RELATED APPLICATIONS

This application is based upon and claims the benefit of U.S. Provisional Application No. 61/355,795, filed on Jun. 17, 2010; the entire contents of which are incorporated herein by reference.

FIELD

Embodiments described herein relate generally to an image forming apparatus and an image forming method.

BACKGROUND

The image forming apparatus (MFP: Multi-Functional Peripheral) forms a visible image corresponding to an image data and outputs the visible image onto a recording medium as an output image.

In the related art, when the power source of the MFP is ON, when the power source returns from a sleep mode, or the like, the MFP executes a warm-up operation in which a fixing device is heated to a predetermined fixing temperature before starting an image forming operation. The fixing temperature at this time is a temperature that can reliably fix a color image.

However, the temperature at which a monochrome image can be fixed is lower than the temperature at which a color image can be fixed. For that reason, when a customer tries to form the monochrome image, unnecessary standby time is imposed on the customer.

BRIEF DESCRIPTION OF THE DRAWINGS

FIG. 1 is an exemplary diagram for showing a configuration of a MFP according to a present embodiment.

FIG. 2 is an exemplary diagram for showing a control unit according to the present embodiment.

FIG. 3 is an exemplary diagram for showing a configuration of a fixing device according to the present embodiment.

FIG. 4 is an exemplary diagram for showing a disposition of a heater of a fixing device according to the present embodiment.

FIG. 5 is an exemplary diagram for explaining an offset of the fixing device according to the present embodiment.

DETAILED DESCRIPTION

Figure 6:
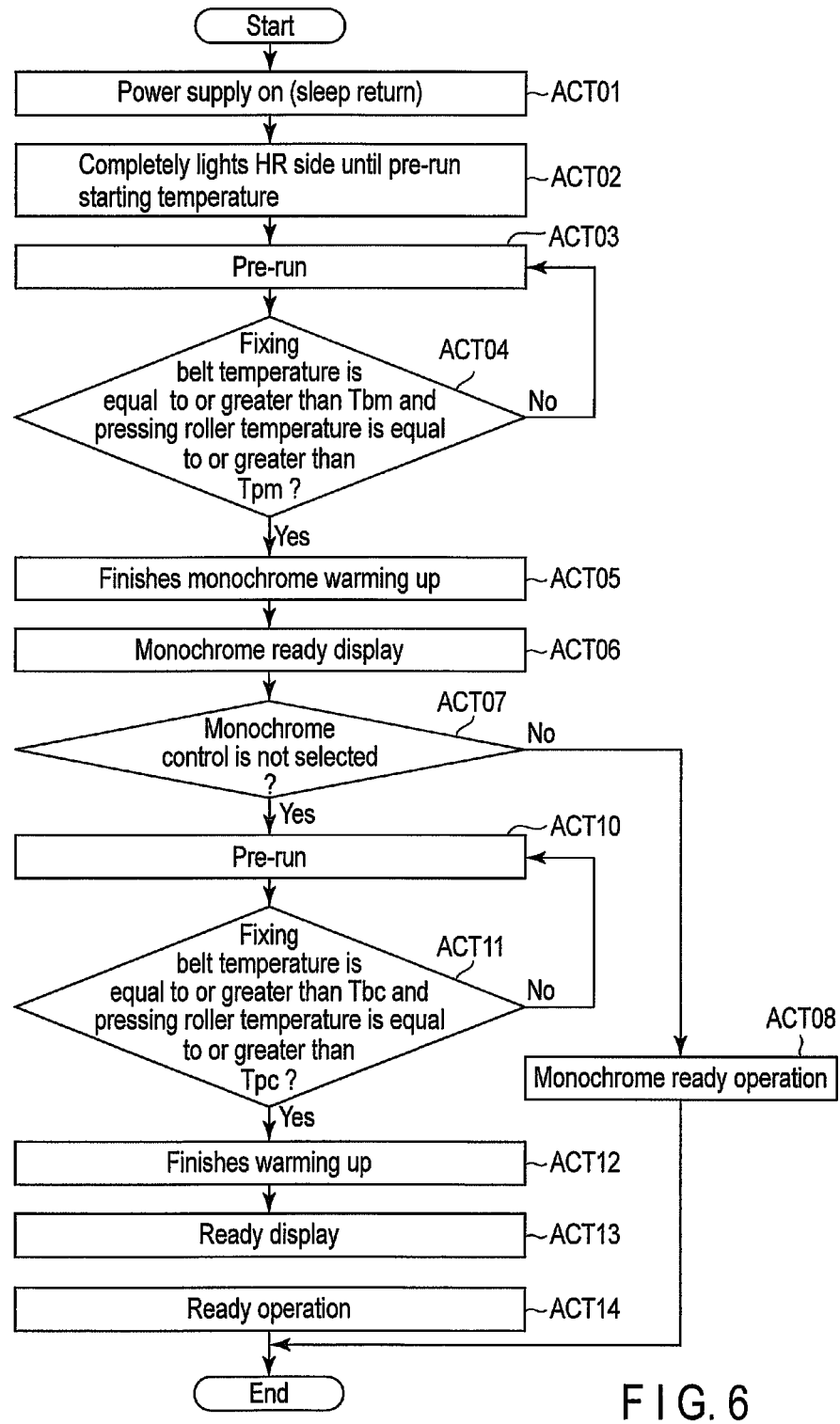
FIG. 6 is an exemplary flow chart for showing a warm-up operation sequence of the fixing device according to the present embodiment.

In general, according to one embodiment, an image forming apparatus includes an image forming portion that forms a toner image on a recording medium; a fixer that is brought into press-contact from both sides with the recording medium formed with the toner image to heat the recording medium at a predetermined fixing temperature; a control operation selection portion which selects any one of a monochrome control operation of keeping the fixing temperature in a first temperature at which a monochrome image can be fixed, and a color control operation of keeping the fixing temperature at a second temperature, at which the color image can be fixed, higher than the first temperature; and a controller, wherein, in the state in which the monochrome control operation is selected, when the fixing temperature reaches the first temperature during rise, the controller executes a monochrome ready display showing that the monochrome image can be fixed, and the monochrome control operation, the controller raises the fixing temperature up to the second temperature to print the color image when printing of a color image is instructed while the monochrome control operation is executed, and the controller executes the monochrome control operation after printing the color image.

[First Embodiment]

Hereinafter, an exemplary embodiment will be described with reference to the drawings.

FIG. 1 is an exemplary diagram for showing a configuration of a MFP according to a present embodiment. The MFP 101 includes an image forming portion 1, a paper supply portion 3, and an image reading portion 5.

The image forming portion 1 outputs image information, for example, as a hard copy or a print-out. The image forming portion 1 fixes a toner to a plain paper or an OHP sheet which is a transparent resin sheet or the like. The paper supply portion 3 supplies the image forming portion 1 with a recording medium of an arbitrary size. The image reading portion 5 incorporates the image information held in a reading target (hereinafter, referred to as an original document) as the image data.

The image reading portion 5 integrally has an auto document feeder (ADF)7. A control panel 9 gives the MFP 101 an image formation starting instruction to the image forming portion 1, an instruction of the reading start of the document by the image reading portion 5 or the like through the operation of a user. The control panel 9 is provided in left or right rear of the image reading portion 5 in a freely movable manner, by a pillar 9a and a swing arm 9b fixed to the image forming portion 1.

The image forming portion 1 includes first to fourth photoconductive drums 11a to 11d, developing devices 13a to 13d, a transfer belt 15, first to fourth cleaners 17a to 17d, a transfer device 19, a fixing device 21, and an exposure device 23.

The first to fourth photoconductive drums 11a to 11d hold a latent image. The developing devices 13a to 13d supply a developer, that is, a toner and develop the latent image held by the photoconductive drums 11a to 11d. The transfer belt 15 holds the image of the toner held by the photoconductive drums 11a to 11d in order. The first to fourth cleaners 17a to 17d remove the toner remaining on the photoconductive drums 11a to 11d from the respective photoconductive drums 11a to 11d. The transfer device 19 transfers the toner image held by the transfer belt 15 onto the recording medium such as the plain paper or the OHP sheet. The fixing device 21 fixes the toner image transferred onto the recording medium by the transfer device 19. The exposure device 23 forms the latent images on the photoconductive drums 11a to 11d.

The first to fourth developing devices 13a to 13d accommodate arbitrary color toners of Y (yellow), M (magenta), C (cyan), and Bk (black) used for obtaining a color image through a subtractive color mixture. The first to fourth developing devices 13a to 13d visualize the latent images held by each of the photoconductive drums 11a to 11d into the corresponding colors of Y, M, C, and Bk. The transfer belt 15 transfers and holds each color toner image formed by the photoconductive drums 11a to 11d and the corresponding developing devices 13a to 13d.

The paper supply portion 3 supplies the recording medium to the transfer device 19 at a predetermined timing. The cassettes provided in a plurality of cassette slots 31 accommodate recording media of arbitrary sizes. A pick-up roller 33 takes out the recording medium from the corresponding cassette depending on the image forming operation. The size of the recording medium corresponds to a magnification required when forming the image and a size of the toner image formed by the image forming portion main body 1.

A separation mechanism 35 prevents two or more recording media from being taken out from the cassette by the pick-up roller 33. A plurality of transport rollers 37 transports the taken recording medium toward an aligning roller 39. The aligning roller 39 sends the recording medium to a transfer position where the transfer device 19 abuts the transfer belt 15 on timing when the transfer device 19 transfers the toner image from the transfer belt 15.

The fixing device 21 fixes the toner image corresponding to the image information to the recording medium and sends the recording medium to a stock portion 47 as the image output (the hard copy or the print-out).

An automatic duplexing unit (ADU) 41 reverse the back and front surfaces of the recording medium with the toner image fixed thereon by the fixing device 21 for the double-sided printing and transports the recording medium to the transfer device 19. A bypass tray is annexed to the ADU 41.

The ADU 41 can be moved to the right side of the drawings. It is possible to easily perform maintenance when the recording medium is clogged between the transport roller 37 and the aligning roller 39 or between the aligning roller 39 and the fixing device 21 or between the transfer device 19 and the fixing device 21. The ADU 41 integrally has a cleaner 43 that cleans the transfer device 19.

A media sensor 45 situated between the transport roller 37 and the aligning roller 39 detects the thickness of the recording medium to be transported to the aligning roller 39. As the media sensor 45, it is possible to use an optical sensor disclosed in U.S. patent application Ser. No. 12/197,880 filed on Aug. 25, 2008 or U.S. patent application Ser. No. 12/199,424 filed on Aug. 27, 2008, or a thickness detection roller disclosed in U.S. Provisional Patent Application No. 61/043,801 filed on Apr. 10, 2008.

FIG. 2 is an exemplary diagram for showing a control unit according to the present embodiment.

A control unit 111 includes an interface 131, a memory 133, a counter 135, an electric power control portion 137, and a CPU (Central Processing Unit) 139.

The interface 131 receives input such as the number of sheets of the output image, the magnification of the output image, the size of the recording medium, and the print starting signal, from the control panel 9. The memory 133 stores various numerical data which was input from the control panel 9, for example, the setting temperatures or the like of each portion of the fixing device 21. The counter 135 counts the number of sheets of the image output. The electric power control portion 137 seeks the electric power usable for increasing the temperature of the fixing device.

The CPU 139 collectively controls the operation of the MFP 101. For example, the CPU 139 controls the temperature of the fixing device 21. Furthermore, the CPU 139 sets the electric power to be supplied to a heater of the fixing device 21. Specifically, the CPU 139 sets the electric power, which is supplied to the heater of the fixing device 21, in a heater driver 143 via an input and output portion 141, depending on the temperature (the fixing temperature) of the fixing device 21 acquired from the respective temperature sensors (for example, thermistors). In addition, the maximum value of the electric power, which can be supplied to the heater, sets the usable electric power obtained by the electric power control portion 137 to the upper limit.

FIG. 3 is an exemplary diagram for showing a configuration of a fixing device according to the present embodiment.

The fixing device 21 includes a heating roller 121, a fixing roller 123, a pressing roller 125, and a fixing belt 127 which is suspended between the heating roller 121 and the fixing roller 123. The pressing roller 125 presses the fixing roller 123 via the fixing belt 127. A region, where the fixing belt 127 comes into contact with the fixing roller 123, forms a nip. Predetermined pressure and temperature are given to the recording medium passing through the nip, and the toner held in the recording medium is melted and fixed.

The heating roller 121 is rotated at a regular speed by a motor (not shown) according to the control of a motor driver 145 shown in FIG. 2. The fixing belt 127 is heated by the heat of the heating roller 121, the recording medium is heated by the heat, and the recording medium is moved at a predetermined speed. In addition, the motor, for example, rotates the heating roller 121, but can also rotate the pressing roller 125. Furthermore, the motor can rotate the fixing roller 123.

The heating roller 121 has, for example, a diameter of 30 mm, and includes a heater 129 therein. The heater 129 may be a lamp, and may be a resistance wire or the like. The heater 129 may be disposed outside of the fixing belt 127. In an example, the heating roller 121 is preferably configured so that tetrafluoroethylene resin or fluorine resin is disposed on the surface of a tube made of aluminum having a thickness of 0.8 mm as a release layer.

The fixing roller 123 has, for example, a diameter of 38 mm, and in an example, the fixing roller 123 is preferably configured so that an elastic body such as silicon rubber is disposed around the shaft at a predetermined thickness.

The pressing roller 125 has, for example, a diameter of 40 mm, and in an example, the pressing roller 125 is preferably configured so that an elastic body such as rubber having a hardness higher than that of the elastic body used in the fixing roller 123 is disposed around the shaft at a predetermined thickness, and the surface thereof is covered with a release layer of tetrafluoroethylene resin or fluorine resin. The pressing roller 125 further includes a heater 128 therein. The heating value of the heater 128 may be ½ to ¼ of the heating value of the heater 129 used in the heating roller 121.

In an example, the fixing belt 127 is preferably configured so that the release layer of tetrafluoroethylene resin or fluorine resin is disposed on the surface (a surface of a side abutting the pressing roller 125) of the elastic body such as silicon rubber having a predetermined thickness. In addition, the elasticity of the silicon rubber preferably has the harness of the same degree as the hardness of the elastic body used in the fixing roller 123 or is softer than the hardness of the elastic body. Furthermore, a reinforcing material of a sheet-like metal (a metallic film) or the like may be provided on the rear surface (a surface of a side abutting the fixing roller 123) if necessary.

FIG. 4 is an exemplary diagram for showing a disposition of a heater of a fixing device according to the present embodiment.

The heating roller 121 includes first and second heater lamps 129a and 129b, the heating regions of which are separated from each other in the longitudinal direction. The heating region of the heater lamp 129a is approximately center of the longitudinal direction of the heating roller 121. The heating regions of the heater lamp 129b are near the both end portions of the longitudinal direction of the heating roller 121. The heating region of the heater lamp 129a does not overlap with the heating region of the heater lamp 129b. In addition, the respective heater lamps 129a and 129b are preferably halogen lamps. Furthermore, the outputs of the respective heater lamps 129a and 129b are about 600 W and preferably two to four times the output of the heater 128 of the pressing roller 125.

The thermistors 122a and 122b as the temperature sensors measure the temperatures of two points in the vicinity of the center in the longitudinal direction and the end portion side of the heating roller 121 in the state in which the fixing belt 127 is interposed therebetween. The thermistor 126 measures the temperature in the vicinity of the center in the longitudinal direction of the pressing roller 125. The CPU 139 controls the heating amount of the heater according to the temperature measured respectively and the maximum suppliable electric power permitted by the electric power control portion 137.

Figure 13:
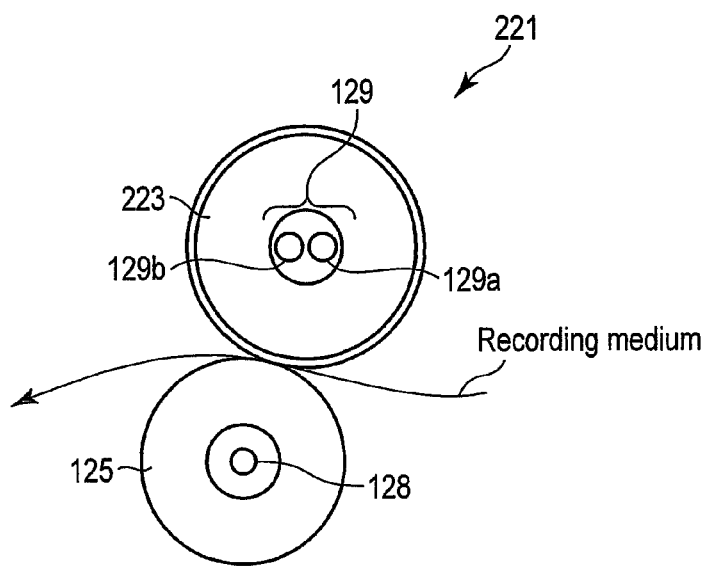
FIG. 13 is an exemplary schematic diagram for showing shows an example of the fixing device of the MFP according to the present embodiment.

In addition, as shown in FIG. 13, a fixing device 221 is also usable in which the heater (a heating mechanism) 129 is provided in the fixing roller 223 without using the fixing belt, and (the fixing roller) is situated so as to come into direct contact with the pressing roller 125. The heater 129 preferably includes first and second heater lamps 129a and 129b, the heating regions of which are separated from each other in regard to the longitudinal direction of the fixing roller 223, as in the example of the heating roller 121 shown in FIG. 4.

Figure 14:
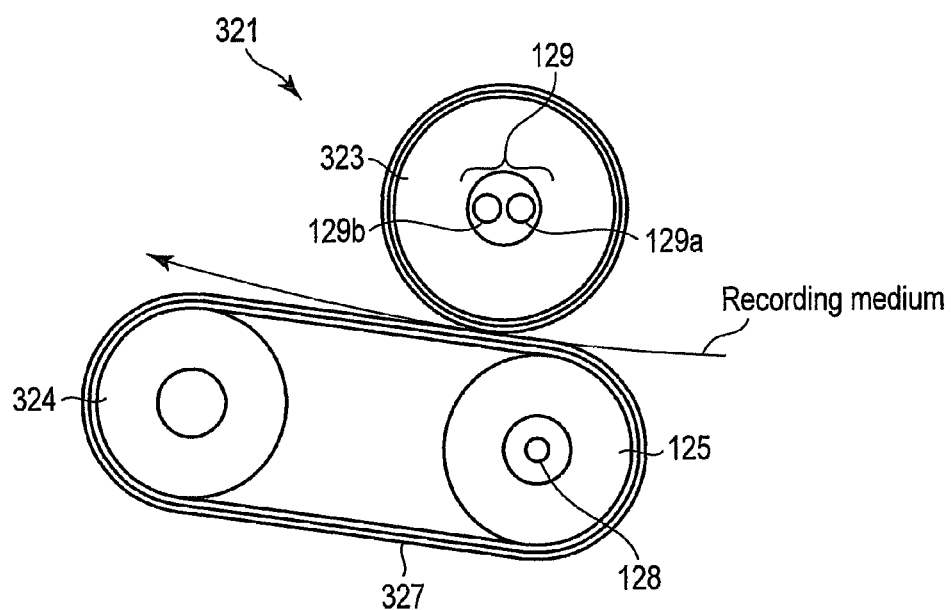
FIG. 14 is an exemplary schematic diagram for showing an example of the fixing device of the MFP according to the present embodiment.

Furthermore, as shown in FIG. 14, a fixing device 321 is also usable in which a fixing roller 323 shown in FIG. 13 (with the heater 129 inserted therein) is provided without using the fixing belt, an auxiliary roller 324 is provided in the pressing roller 125 side, and a fixing belt 327 giving a predetermined tension by the pressing roller 125 and the auxiliary roller 324 is used.

FIG. 5 is an exemplary diagram for explaining an offset of the fixing device according to the present embodiment. The longitudinal axis of FIG. 5 shows the temperature of the fixing belt 127, and the transverse axis thereof shows the temperature of the pressing roller 125.

The offset phenomenon in the fixing device 21 is a phenomenon in which, since the melting of the toner is not suitable, the toner is attached to each member of the fixing device 21 and remains. In a region A, the offset is not generated in both of the color image and the monochrome image. In a region C, the offset is generated in both of the color image and the monochrome image. In a region B, the offset is not generated in the monochrome image, but the offset is generated in the color image.

The toners used in the MFP 101 are Bk (black), C (cyan), M (magenta), and Y (yellow). The melting points of each toner are identical to each other, but in the monochrome image, the image is formed using one toner, on the other hand, in the color image, a plurality of toners overlaps with each other, and the toner layer becomes thick. For this reason, in the region B, the offset is not generated in the monochrome image, but the offset is generated in the color image.

FIG. 6 is an exemplary flow chart for showing a warm-up operation sequence of the fixing device according to the present embodiment.

In the MFP 101 of the present embodiment, the monochrome control forming the monochrome image or the color control forming the color image is selected by a user in advance. The selection may be set from the control panel 9 by a user and may be set as a default in advance by a service technician.

In Act 01, when the power source of the MFP 101 is ON, the CPU 139 starts the warm-up operation of the fixing device 21. In addition, the warm-up operation of the fixing device 21 is also started even when MFP 101 returns from the sleep state. In Act 02, the CPU 139 turns on all of the first and second heater lamps 129a and 129b of the heating roller 121, and waits until the thermistors 122a and 122b detect a predetermined pre-run starting temperature Tpc. At this time, the heating roller 121 is not rotated.

When the temperature of the fixing belt 127 becomes the pre-run starting temperature Tpc, that is, the thermistors 122a and 122b detect the pre-run starting temperature Tpc, the CPU 139 starts the pre-run in Act 03. The CPU 139 rotates the heating roller 121 and turns the heater 128 of the pressing roller 125 ON. In Act 04, the CPU 139 continues to pre-run until the temperature of the fixing belt 127 is equal to or greater than the monochrome belt temperature Tbm, and the temperature of the pressing roller 125 is equal to or greater than the monochrome pressing temperature Tpm. Herein, the monochrome belt temperature Tbm and the monochrome pressing temperature Tpm are temperatures belonging to the region B of FIG. 5.

When the temperature of the fixing belt 127 is equal to or greater than the monochrome belt temperature Tbm and the temperature of the pressing roller 125 is equal to or greater than the monochrome pressing temperature Tpm (Yes in Act 04), the CPU 139 decides that the monochrome warm-up is finished in Act 05. Moreover, in Act 06, the CPU 139 executes the monochrome ready display on the control panel 9. For example, a message "The monochrome operation can be performed" may be displayed, and "Monochrome ready" may be displayed.

In Act 07, the CPU 139 determines whether or not any one of the monochrome control or the color control is selected. When the monochrome control is selected (NO in Act 07), the CPU 139 executes the monochrome ready operation of maintaining the temperature of the fixing device 21 in a predetermined temperature in Act 08. That is, the CPU 139 controls the temperature so that the temperature of the fixing belt 127 and the temperature of the pressing roller 125 are within the region B mentioned above.

Figure 7:
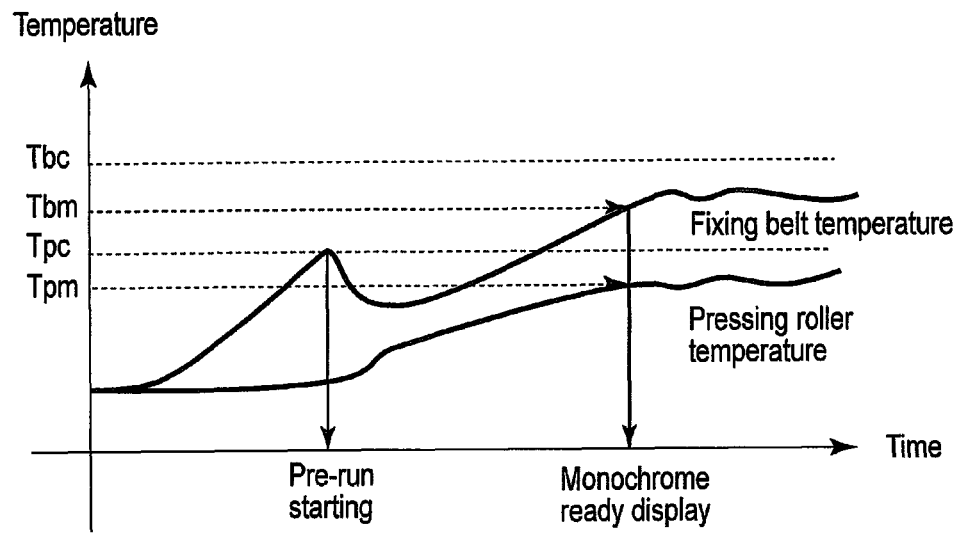
FIG. 7 is a diagram for explaining a monochrome warm-up operation executed by the fixing device according to the present embodiment.

FIG. 7 is a diagram for explaining a monochrome warm-up operation executed by the fixing device according to the present embodiment. FIG. 7 shows a time transition between the fixing belt temperature and the pressing roller temperature.

When the warm-up is started, since the heater lamps 129a and 129b are turned on, the temperature of the fixing belt 127 rises. When the temperature of the fixing belt 127 reaches the temperature Tpc, the pre-run is started. Since the fixing belt 127 is rotated by the starting of the pre-run, the heat of the heating roller 121 is moved to the fixing roller 123. As a result, the temperature of the fixing belt 127 is temporarily equal to or less than the temperature Tpc, but the temperature is increased over time. Meanwhile, the temperature of the pressing roller 125 is increased by the heat transmitted from the fixing belt 127 and the heating of the heater 128.

Moreover, when the temperature of the fixing belt 127 is equal to or greater than the monochrome belt temperature Tbm and the temperature of the pressing roller 125 is equal to or greater than the monochrome pressing temperature Tpm, the monochrome ready display is performed. Moreover, the temperature control is performed so that the temperature of the fixing belt 127 maintains the monochrome belt temperature Tbm, and the temperature of the pressing roller 125 maintains the monochrome pressing temperature Tpm. In addition, the pre-run starting temperature is an arbitrary temperature smaller than the monochrome belt temperature Tbm.

Next, the processing of FIG. 6 is continuously described, and the sequence, when the color control is selected, will be described.

When the color control is selected (in Act 07, Yes), the CPU 139 continues the pre-run in Act 10. That is, the CPU 139 continues the rotation of the heating roller 121 and the heating of the heating roller 121 and the pressing roller 125. Moreover, in Act 11, the CPU 139 examines whether or not the temperature of the fixing belt 127 is equal to or greater than the color belt temperature Tbc and the temperature of the pressing roller 125 is equal to or greater than the color pressing temperature Tpc. Herein, the color belt temperature Tbc and the color pressing temperature Tpc are temperatures belonging to the region A of FIG. 5.

When the temperature of the fixing belt 127 is equal to or greater than the color belt temperature Tbc and the temperature of the pressing roller 125 is equal to or greater than the color pressing temperature Tpc (Yes in Act 11), the CPU 139 decides that the warm-up is finished in Act 12. Moreover, in Act 13, the CPU 139 executes the ready display in the control panel 9. For example, a message "The monochrome operation and the color operation can be performed" may be displayed, and "Ready" may be displayed.

In Act 14, the CPU 139 executes the ready operation of maintaining the temperature of the fixing device 21 in a predetermined temperature. That is, the CPU 139 controls the temperature so that the temperature of the fixing belt 127 and the temperature of the pressing roller 125 are within the region A mentioned above.

Figure 8:
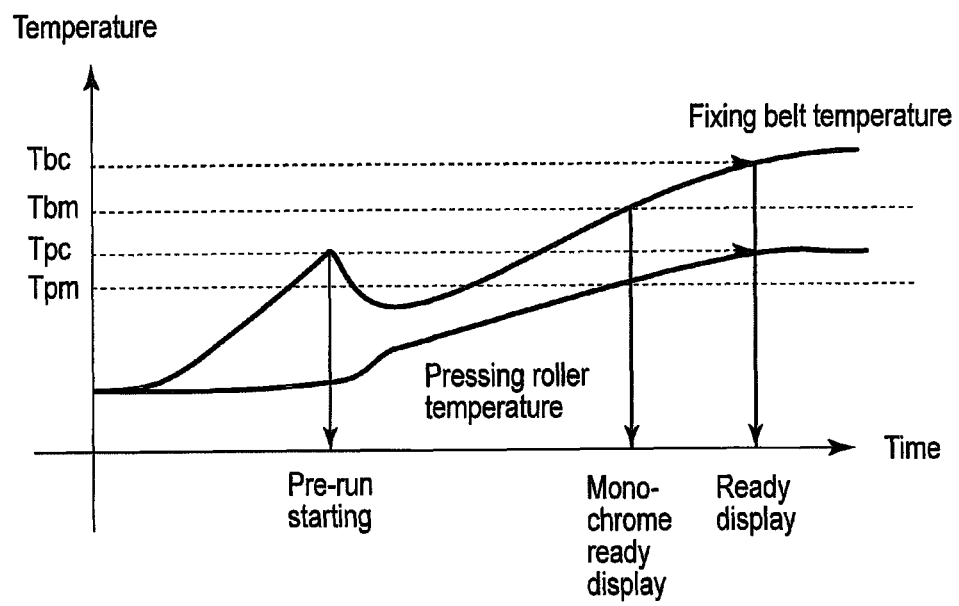
FIG. 8 is a diagram for explaining a color warm-up operation executed by the fixing device according to the present embodiment.

FIG. 8 is a diagram for explaining a color warm-up operation executed by the fixing device according to the present embodiment. In FIG. 8, the operations to the monochrome ready display are the same as those of FIG. 7, and thus the description thereof will be omitted.

When the temperature of the fixing belt 127 is equal to or greater than the monochrome belt temperature Tbm and the temperature of the pressing roller 125 is equal to or greater than the monochrome pressing temperature Tpm, the monochrome ready display is performed. After that, the warm-up operation by the pre-run is continued, and when the temperature of the fixing belt 127 is equal to or greater than the color belt temperature Tbc and the temperature of the pressing roller 125 is equal to or greater than the color pressing temperature Tpc, the ready display is executed.

Moreover, the temperature control is performed so that the temperature of the fixing belt 127 maintains the color belt temperature Tbc and the temperature of the pressing roller 125 maintains the color pressing temperature Tpc. In addition, although the same value as the color pressing temperature Tpc is adopted in the pre-run starting temperature, the pre-run starting temperature may be an arbitrary temperature smaller than the monochrome belt temperature Tbm, without being limited thereto.

[Second Embodiment]

In a second embodiment, an operation will be treated when the monochrome control is selected and there is a printing instruction of the color image during the monochrome ready operation. The same parts as those of the first embodiment will be denoted by the same reference numerals and the detailed descriptions thereof will be omitted.

Figure 9:
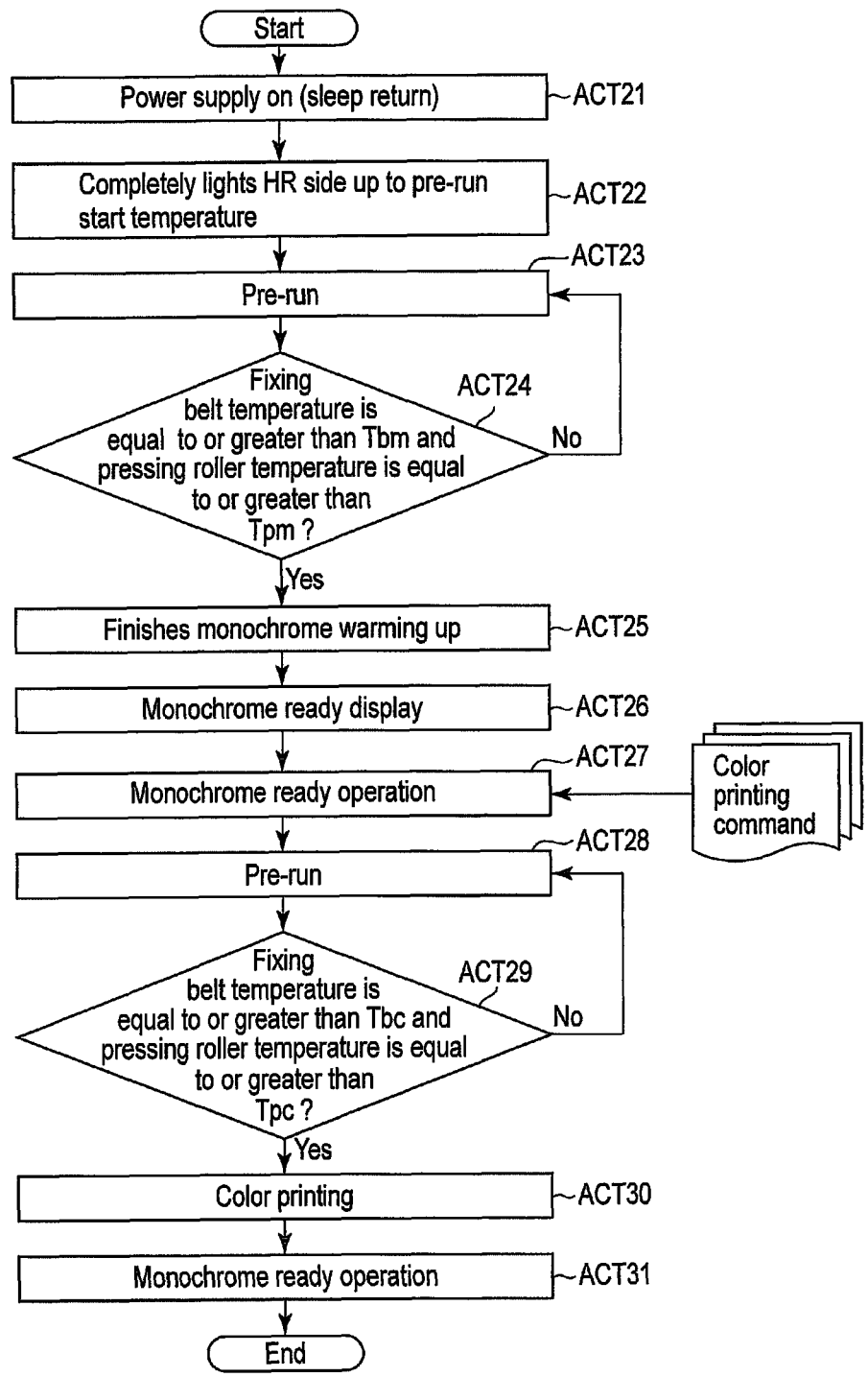
FIG. 9 is an exemplary flow chart for showing a warm-up operation sequence of a fixing device according to a second embodiment.

FIG. 9 is an exemplary flow chart for showing a warm-up operation sequence of a fixing device according to a second embodiment.

Since the processing sequences from Act 21 to Act 27 are the same as the processing sequences from Act 01 to Act 08 of FIG. 6, the detailed descriptions thereof will be omitted.

During the monochrome ready operation of Act 27, an operation will be described when the printing instruction of the color image is input. The printing instruction of the color image may be input from the control panel 9, and may be input from a PC (personal computer) (not shown) connected to the MFP 101.

In Act 28, the CPU 139 starts the pre-run. That is, the CPU 139 starts the rotation of the heating roller 121 and the heating of the heating roller 121 and the pressing roller 125. Moreover, in Act 29, the CPU 139 examines whether or not the temperature of the fixing belt 127 is equal to or greater than the color belt temperature Tbc and the temperature of the pressing roller 125 is equal to or greater than the color pressing temperature Tpc.

When the temperature of the fixing belt 127 is equal to or greater than the color belt temperature Tbc and the temperature of the pressing roller 125 is equal to or greater than the color pressing temperature Tpc (Yes in Act 29), the CPU 139 executes the printing operation of the color image in Act 30. After finishing printing of a color image, in Act 31, the CPU 139 executes the monochrome ready operation. That is, the temperature control is performed so that the temperature of the fixing belt 127 is the monochrome belt temperature Tbm and the temperature of the pressing roller 125 is the monochrome pressing temperature Tpm.

Figure 10:
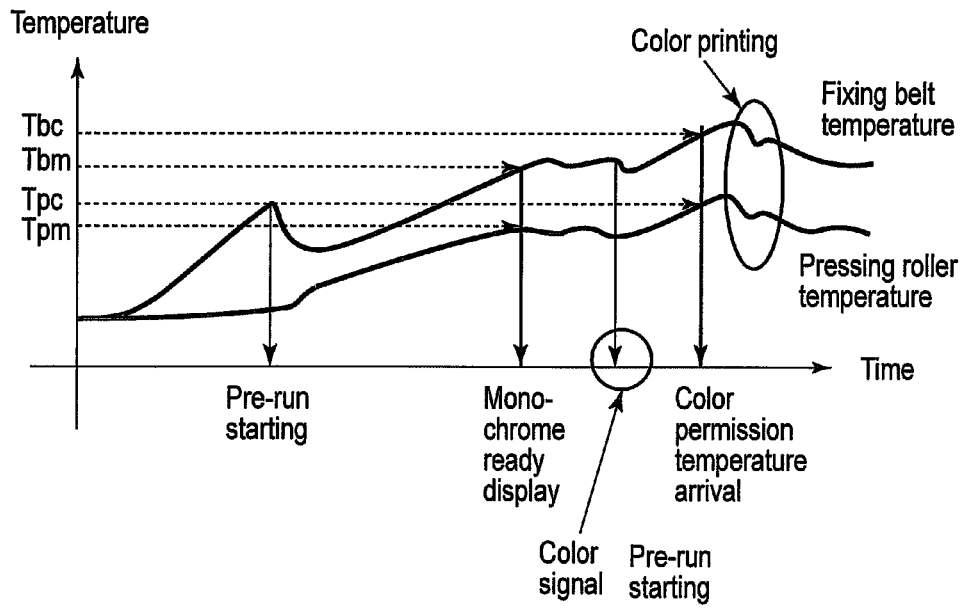
FIG. 10 is a diagram for explaining an operation executed by the fixing device according to the second embodiment.

FIG. 10 is a diagram for explaining an operation executed by the fixing device according to the second embodiment. In FIG. 10, since the operations to the monochrome ready display are the same as those of FIG. 7, the descriptions thereof will be omitted.

When the printing instruction of the color image is input during the monochrome ready operation, the pre-run is started, and the temperatures of the fixing belt 127 and the pressing roller 125 rise. Moreover, when the respective temperatures reach the color pressing temperature Tpc and the color belt temperature Tbc which are color permission temperatures, the color printing operation is started. After finishing the color printing, each temperature is controlled to the monochrome belt temperature Tbm and the monochrome pressing temperature Tpm which are monochrome ready temperatures.

In addition, in the second embodiment, although the color printing instruction is input during the monochrome ready operation, the color printing instruction may be input until starting the monochrome ready operation in some cases. At this time, the monochrome ready operation is not executed, and when the monochrome warming-up is finished, the pre-run is instantly started, and the temperature rises up to the color permission temperature.

[Third Embodiment]

In a third embodiment, an operation will be treated when the color control is selected and there is a printing instruction of the monochrome image during operation until the monochrome ready is displayed. The same parts as those of the first embodiment will be denoted by the same reference numerals and the detailed descriptions thereof will be omitted.

Figure 11:
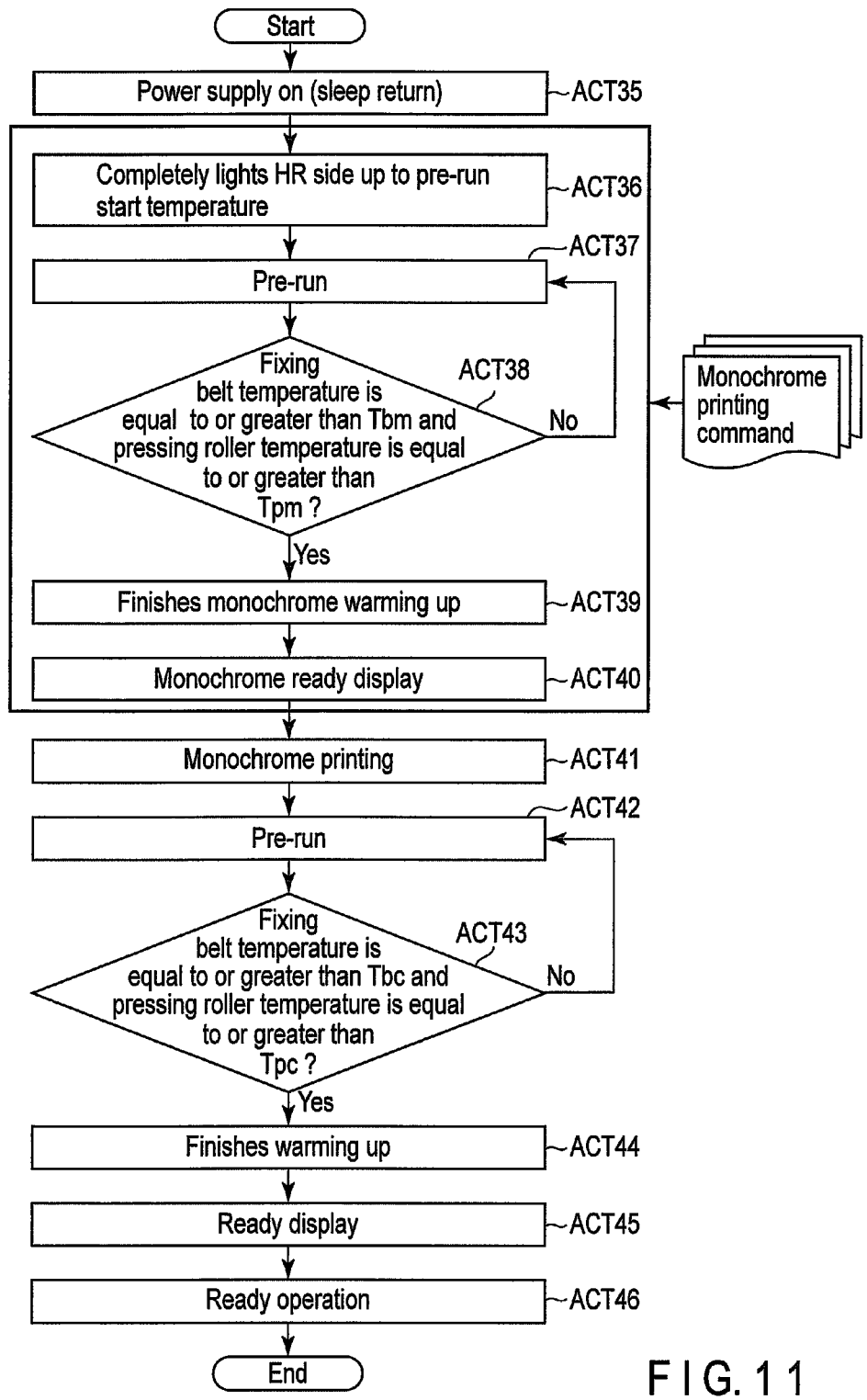
FIG. 11 is an exemplary flow chart for showing a warm-up operation sequence of a fixing device according to a third embodiment.

FIG. 11 is an exemplary flow chart for showing a warm-up operation sequence of a fixing device according to a third embodiment.

Since the processing sequences from Act 35 to Act 40 are the same as the processing sequences from Act 01 to Act 06 of FIG. 6, the detailed descriptions thereof will be omitted.

When the printing instruction of the monochrome image is performed during monochrome ready display of Act 40, the CPU 139 executes the monochrome printing after the monochrome ready display in Act 41. After finishing the monochrome printing, the pre-run is started in Act 42. Moreover, in Act 43, the CPU 139 examines whether or not the temperature of the fixing belt 127 is equal to or greater than the color belt temperature Tbc and the temperature of the pressing roller 125 is equal to or greater than the color pressing temperature Tpc.

When the temperature of the fixing belt 127 is equal to or greater than the color belt temperature Tbc and the temperature of the pressing roller 125 is equal to or greater than the color pressing temperature Tpc (Yes in Act 43), the CPU 139 decides that the warm-up is finished in Act 44. Moreover, in Act 45, the CPU 139 executes the ready display on the control panel 9.

In Act 46, the CPU 139 executes the ready operation of maintaining the temperature of the fixing device 21 in a predetermined temperature. That is, the CPU 139 controls the temperature so that the temperature of the fixing belt 127 and the temperature of the pressing roller 125 are within the region A mentioned above.

Figure 12:
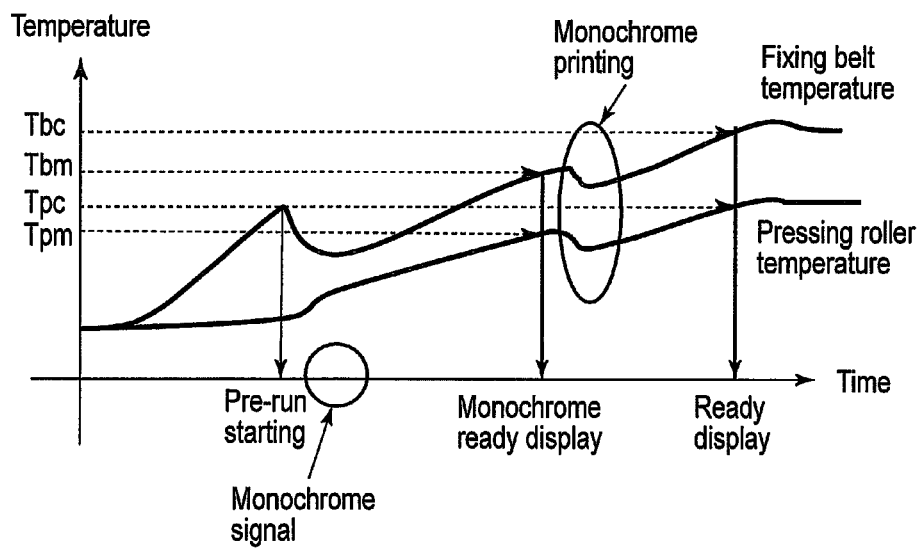
FIG. 12 is a diagram for explaining an operation executed by the fixing device according to the third embodiment.

FIG. 12 is a diagram for explaining an operation executed by the fixing device according to the third embodiment. In FIG. 12, since the operations to the monochrome ready display are the same as those of FIG. 8, the descriptions thereof will be omitted.

When the temperature of the fixing belt 127 is equal to or greater than the monochrome belt temperature Tbm and the temperature of the pressing roller 125 is equal to or greater than the monochrome pressing temperature Tpm, the monochrome ready display is performed. When the printing instruction of the monochrome image is input until the monochrome ready display, the monochrome printing is executed after the monochrome ready display.

After executing the monochrome printing, the warm-up operation by the pre-run is continued, and when the temperature of the fixing belt 127 is equal to or greater than the color belt temperature Tbc and the temperature of the pressing roller 125 is equal to or greater than the color pressing temperature Tpc, the ready display is performed.

Moreover, the temperature control is performed so that the temperature of the fixing belt 127 maintains the color belt temperature Tbc and the temperature of the pressing roller 125 maintains the color pressing temperature Tpc.

In addition, in the third embodiment, the monochrome ready display is performed in Act 40, but the monochrome printing of Act 41 may be executed without performing the monochrome ready display.

According to each embodiment mentioned above, a suitable control depending on the using application of a user can be performed, whereby it is possible to promote reductions in unnecessary power consumption and standby time.

In addition, in each embodiment mentioned above, the monochrome control or the color control is selected for the MFP 101 as a whole. However, the monochrome control or the color control may be selected for each operation state of the MFP 101 without being limited thereto. For example, the monochrome control or the color control may be selected in each state of the warm-up operation in the power supply ON and the return operation from the sleep.

In addition, each function described in the aforementioned embodiment may be configured by hardware or may be realized by reading a program, in which each function is described using software, in a computer. Furthermore, each function may be configured by suitably selecting any one of the software and the hardware.

Furthermore, each function can be realized by reading the program stored on a recording medium (not shown) in a computer. Herein, the recording medium in the present embodiment may have any form of recording type if the recording medium can record the program and can be read by a computer.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
an image forming portion configured to form a toner image on a recording medium;
a fixer configured to heat the recording medium on which the toner image is formed; and
a controller that sets as an operation mode one of a monochrome mode for keeping a temperature of the fixer at a first temperature at which a monochrome image can be fixed and a color mode for keeping the temperature of the fixer at a second temperature higher than the first temperature, at which a color image can be fixed,
wherein,
when printing of a color image is instructed in the monochrome mode, the controller raises the temperature of the fixer up to the second temperature to print the color image, and
the controller returns the temperature of the fixer to the first temperature after completion of the printing of the color image.

2. The apparatus according to claim 1,
wherein, in the monochrome mode, when printing of a color image is instructed during a warm-up for raising the temperature of the fixer to the first temperature, the controller consecutively raises the temperature of the fixer to the second temperature to print the color image, and executes the monochrome mode after completion of the printing of the color image.

3. The apparatus according to claim 1,
wherein the first temperature is a temperature at which a fixing offset is generated in printing of the color image, and
the second temperature is a temperature at which the fixing offset is not generated in printing of both of the monochrome image and the color image.

4. The apparatus according to claim 1,
wherein the monochrome mode and the color mode can be selected for each state during warm-up operation when the power supply is ON and during return operation from a sleep mode.

5. The apparatus according to claim 1,
wherein the fixer includes a heating portion that heats the recording medium; and
a pressing portion that comes into press-contact with the heating portion via the recording medium to press the recording medium.

6. The apparatus according to claim 5, further comprising:
a heater portion configured to raise the temperature of the heating portion by heating itself.

7. An image forming apparatus comprising:
an image forming portion configured to form a toner image on a recording medium;
a fixer configured to heat the recording medium on which the toner image is formed; and
a controller that sets as an operation mode one of a monochrome mode for keeping a temperature of the fixer at a first temperature at which a monochrome image can be fixed and a color mode for keeping the temperature of the fixer at a second temperature higher than the first temperature, at which a color image can be fixed,
wherein, when printing of the monochrome image is instructed during a warm-up for raising the temperature of the fixer to the second temperature in the color mode, the controller prints the monochrome image after the temperature of the fixer reaches the first temperature, and
raises the temperature of the fixer up to the second temperature after completion of the printing of the monochrome printing.

8. The apparatus according to claim 7,
wherein, in the color mode, the controller executes a monochrome ready display showing that the monochrome image can be fixed from a time when the temperature of the fixer reaches the first temperature to a time when the temperature of the fixer reaches the second temperature during a warm-up,
when printing of the monochrome image is instructed during the warm up before the temperature of the fixer reaches the first temperature, prints the monochrome image without executing the monochrome ready display.

9. The apparatus according to claim 7,
wherein the first temperature is a temperature at which a fixing offset is generated in printing of the color image, and
the second temperature is a temperature at which the fixing offset is not generated for both of the monochrome image and the color image.

10. The apparatus according to claim 7,
wherein the monochrome mode and the color mode can be selected for each state during warm-up operation when a power supply is ON and during return operation from a sleep mode.

11. The apparatus according to claim 7,
wherein the fixer includes
a heating portion that heats the recording medium; and
a pressing portion that comes into press-contact with the heating portion via the recording medium to press the recording medium.

12. The apparatus according to claim 11, further comprising:
a heat generating portion that raises the temperature of the heating portion by heating itself.

13. An image forming method of an image forming apparatus which includes an image forming portion configured to form a toner image on a recording medium; and
a fixer configured to heat the recording medium on which the toner image is formed, the method comprising:
keeping a temperature of the fixer at a first temperature at which a monochrome image can be fixed,
raising the fixing temperature up to a second temperature higher than the first temperature, at which a color image can be fixed to print the color image, when printing of the color image is instructed; and
returning the temperature of the fixer to the first temperature after completion of the printing of the color image.

14. The method according to claim 13, further comprising consecutively rising the temperature of the fixer to the second temperature to print the color image, when printing of a color image is instructed while the fixing temperature rises in the state in which the monochrome control operation is set, and
returning the temperature of the fixer to the first temperature after completion of the printing of the color image.

15. The method according to claim 13,
wherein the first temperature is a temperature at which a fixing offset is generated in printing of the color image, and
the second temperature is a temperature at which the fixing offset is not generated in printing of both of the monochrome image and the color image.

16. The method according to claim 15,
wherein the monochrome mode and the color mode can be selected for each state during warm-up operation when a power supply is ON and during return operation from a sleep mode.

17. The method according to claim 13,
wherein the fixer includes a heating portion that heats the recording medium; and
a pressing portion that comes into press-contact with the heating portion via the recording medium to press the recording medium.

18. The method according to claim 17,
wherein the fixer further includes a heater portion that raises the temperature of the heating portion by heating itself.

* * * * *